(12) United States Patent
Dikshit et al.

(10) Patent No.: US 11,528,224 B1
(45) Date of Patent: Dec. 13, 2022

(54) DYNAMIC TRAFFIC REDIRECTION FOR A VIRTUAL GATEWAY OF A DISTRIBUTED TUNNEL FABRIC

(71) Applicant: Hewlett Packard Enterprise Development LP, Houston, TX (US)

(72) Inventors: Saumya Dikshit, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/503,157

(22) Filed: Oct. 15, 2021

(51) Int. Cl.
  G06F 15/173 (2006.01)
  H04L 45/64 (2022.01)
(52) U.S. Cl.
  CPC .................................. *H04L 45/64* (2013.01)
(58) Field of Classification Search
  CPC ....................................................... H04L 45/64
  USPC ......................................................... 709/223
  See application file for complete search history.

(56) References Cited

U.S. PATENT DOCUMENTS

| | | | |
|---|---|---|---|
| 7,756,027 B1* | 7/2010 | Reddy .................. | H04L 41/0893 370/401 |
| 9,450,817 B1* | 9/2016 | Bahadur ............. | H04L 41/0806 |
| 2004/0117251 A1* | 6/2004 | Charles Shand ....... | H04L 45/12 705/14.69 |
| 2013/0242745 A1* | 9/2013 | Umezuki ................ | H04L 47/17 370/236 |
| 2020/0014613 A1* | 1/2020 | Palapra .................. | H04L 41/082 |

FOREIGN PATENT DOCUMENTS

EP    3697038 A1 *  8/2020  ......... H04L 12/4641

\* cited by examiner

*Primary Examiner* — Hee Soo Kim
(74) *Attorney, Agent, or Firm* — Park, Vaughan, Fleming & Dowler LLP

(57) ABSTRACT

A system for redirecting traffic is provided. The system can allow a first switch to participate in a virtual switch in conjunction with a second switch of an overlay tunnel fabric. A path between a respective switch pair of an underlying network of the fabric can be determined based on a routing process. The first and second switches may individually participate in the routing process. Hence, the packets to a tunnel to the virtual switch can be distributed among paths to the first and second switches. The system can determine a trigger condition indicating that packets subsequently received via the tunnel is to be directed to a path to the second switch. The first and second switches can remain in an operational state. The system can then advertise a high cost for a link to the first switch for the routing process in the underlying network.

20 Claims, 7 Drawing Sheets

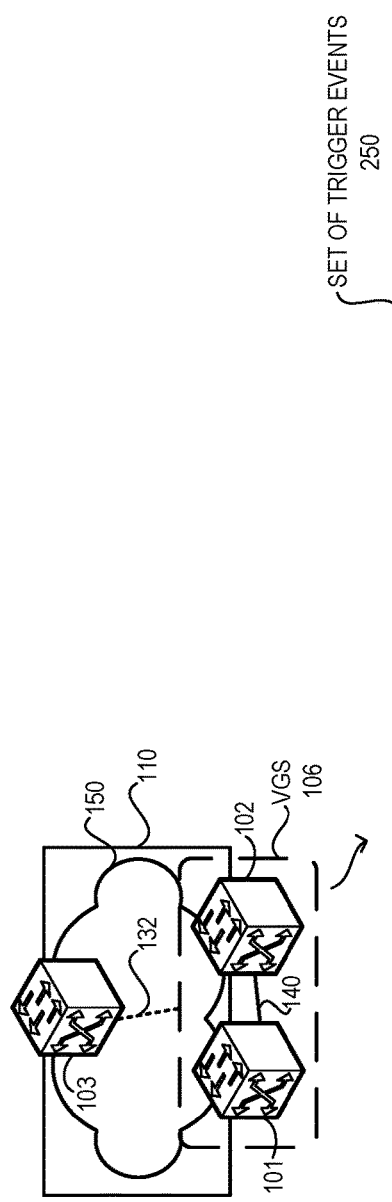

| EVENT ID 252 | EVENT 254 | TRIGGER CONDITION 256 | RESET CONDITION 258 |
|---|---|---|---|
| 262 | INCONSISTENT TUNNEL STATES | LOCAL TUNNEL STATE DOWN, PEER TUNNEL STATE UP | ALL TUNNEL STATES UP |
| 264 | ISL OVERUTILIZED WITH REDIRECTION TRAFFIC | ISL TRAFFIC VOLUME BEYOND THRESHOLD | ISL TRAFFIC VOLUME BELOW THRESHOLD FOR PREDETERMINED PERIOD |
| 266 | CLIENT-FACING CONNECTION NON-OPERATIONAL | ALL EDGE CONNECTIONS NON-OPERATIONAL AT LOCAL SWITCH | SUBSET OF EDGE CONNECTIONS OPERATIONAL |
| 268 | TRAFFIC ARRIVAL PRIOR TO HOST DETECTION FROM EDGE PORTS | TUNNEL(S) OPERATIONAL PRIOR HOST DETECTION | LEARNING HOST INFORMATION FROM EDGE PORT(S) |
| 270 | LOCAL SWITCH RELOAD/REBOOT | LOCAL SWITCH INITIALIZED, VPN OPERATIONAL ON PEER | ALL TUNNEL STATES UP |
| 272 | SINGLE-POINT CLIENT CONNECTION (DUE TO CLIENT MIGRATION) | ALL ROUTING ADJACENCIES TO CLIENT DEVICES UNAVAILABLE | ROUTING ADJACENCIES TO CLIENT DEVICES RE-ESTABLISHED, ROUTE RE-LEARNED |
| 274 | TIMER-BASED EVENT | TIMER INITIATED | TIMER COMPLETED |

SET OF TRIGGER EVENTS 250

FIG. 2B

DYNAMIC TRAFFIC REDIRECTION FOR A VIRTUAL GATEWAY OF A DISTRIBUTED TUNNEL FABRIC

BACKGROUND

Field

The present disclosure relates to communication networks. More specifically, the present disclosure relates to a method and system for facilitating efficient traffic redirection for a virtual gateway of a distributed tunnel fabric.

BRIEF DESCRIPTION OF THE FIGURES

FIG. 2B illustrates a non-exhaustive set of events causing traffic redirection for a VGS of a distributed tunnel fabric, in accordance with an aspect of the present application.

In the figures, like reference numerals refer to the same figure elements.

DETAILED DESCRIPTION

Figure 1:
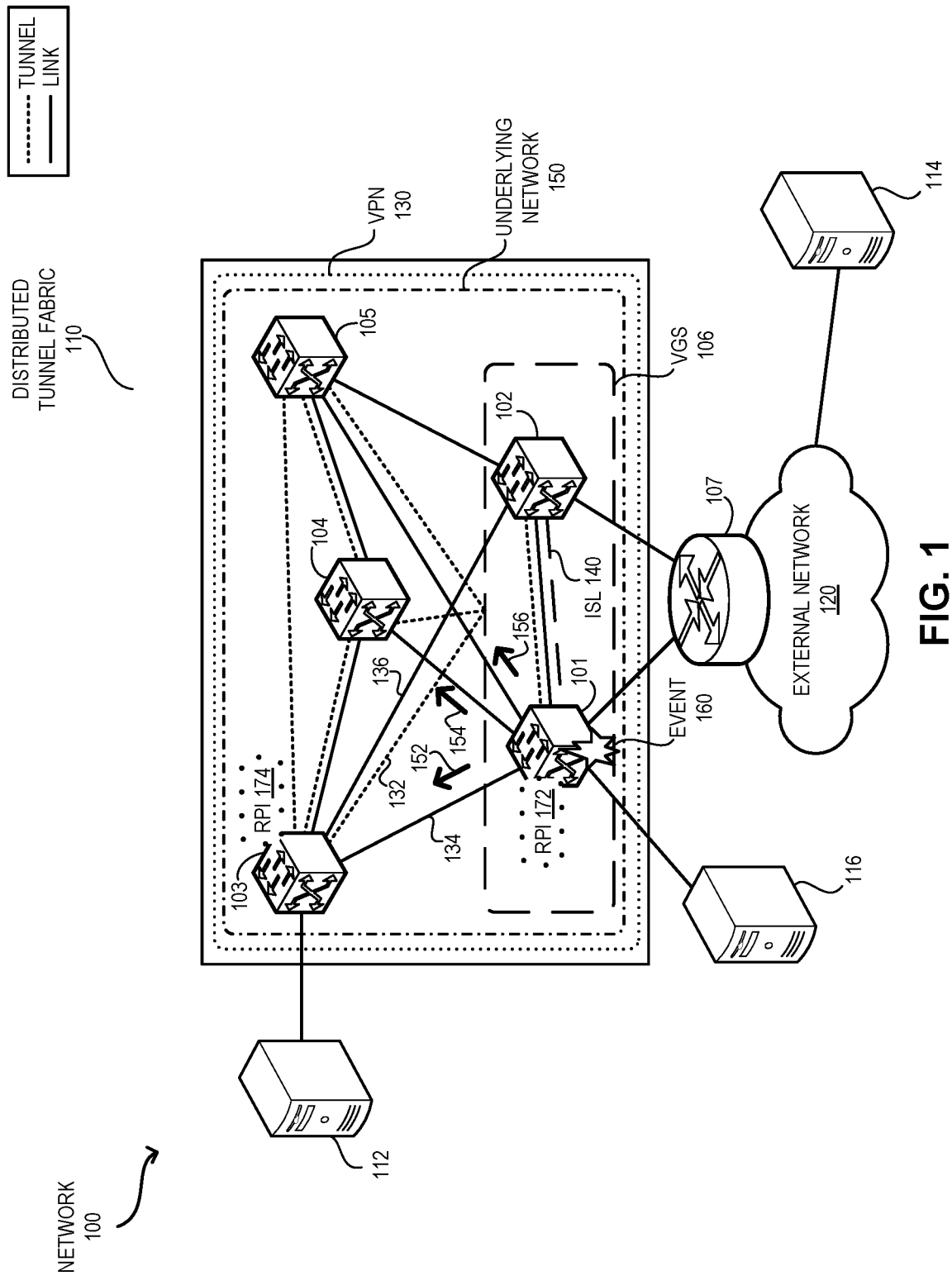
FIG. 1 illustrates an example of traffic redirection for a virtual gateway switch (VGS) of a distributed tunnel fabric using an underlying physical network, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed. Since a VPN can be distributed across the tunnel fabric, a VPN over the tunnel fabric can also be referred to as a distributed tunnel fabric. A gateway of the fabric can be a virtual gateway switch (VGS) shared among a plurality of participating switches. Typically, a respective of the participating switches can receive traffic from tunnels to the VGS via equal-cost paths. Consequently, selecting which participating switch should receive traffic under a particular network condition (e.g., due to one or more events) can be challenging.

One aspect of the present technology can provide a system for redirecting traffic. The system can allow a first switch to participate in a virtual switch in conjunction with a second switch. The virtual switch can operate as a gateway for an overlay tunnel fabric that includes the first and second switches. A path between a respective switch pair of an underlying network of the overlay tunnel fabric can be determined based on a routing process. The first and second switches may individually participate in the routing process. Hence, the packets to a tunnel to the virtual switch can be distributed among paths to the first and second switches in the underlying network. The system can then determine, at the first switch, a trigger condition for an event indicating that packets subsequently received via the tunnel to the virtual switch is to be directed to a path to the second switch. However, the first and second switches can remain in an operational state. Upon determining the trigger condition, the system can advertise a high cost for a link to the first switch for the routing process in the underlying network, thereby bypassing the distribution of packets to the virtual switch among the paths to the first and second switches.

In a variation on this aspect, the system can determine whether the event is complete. If the event is complete, the system can advertise a default cost for the link to the first switch for the routing process in the underlying network, thereby resetting the distribution of packets to the virtual switch among the paths to the first and second switches.

In a variation on this aspect, the trigger condition can indicate that a tunnel state is inconsistent between the switch and the second switch.

In a variation on this aspect, the trigger condition can indicate that the volume of traffic on an inter-switch link between the first and second switches is above a threshold.

In a variation on this aspect, the trigger condition can indicate that a tunnel to the virtual switch is operational at the first switch prior to detecting a host via an edge port.

In a variation on this aspect, the trigger condition can indicate that the first switch has rebooted, and the packet processing for the overlay tunnel fabric is operational in the second switch.

In a variation on this aspect, the trigger condition can indicate one or more of: non-operational edge connections at the first switch, and unavailable routing adjacencies to devices of a client, thereby indicating migration of the client.

In a variation on this aspect, the trigger condition can indicate the initiation of a timer indicating the duration of the event.

In a variation on this aspect, the system can configure the high cost in routing information associated with the underlying network. Advertising the high cost can then include sending a link-state advertisement using a local instance of the routing process.

The aspects described herein solve the problem of traffic redirection to a subset of participating switches of a VGS of a fabric by (i) configuring a distinguishable cost (e.g., a high cost) to the rest of participating switches upon determining a triggering event; and (ii) advertising the distinguishable cost to neighboring switches in the underlying network of the fabric. Consequently, the other switches of the fabric, using the routing process of the underlying network, can determine that the traffic to the VGS should be carried via the corresponding paths to the subset of participating switches. In this way, the other switches can avoid forwarding traffic to the rest of the participating switches during the event.

The fabric can include a VGS that can couple the fabric to other networks. Typically, at least two switches can operate as a single switch in conjunction with each other to facilitate the VGS. Switches participating in the VGS can be referred to as participating switches. A respective participating switch can consider the other participating switches as peer participating switches (or peer switches). The VGS can be associated with one or more virtual addresses (e.g., a virtual Internet Protocol (IP) address and/or a virtual media access control (MAC) address). A respective tunnel formed at the VGS can use the virtual address to form the tunnel endpoint. As a result, other tunnel endpoints of the fabric can consider the VGS as the other tunnel endpoint for a tunnel instead of any of the participating switches.

A respective participating switch may publish the same virtual address (e.g., the virtual IP address) to the other switches, which are the non-participating switches, of the underlying network. Since the participating switches form the VGS, the respective paths the participating switches typically have the same routing weight (e.g., the same number of hops or same total link weights). Hence, the participating switches can be considered as equidistant from a non-participating switch in the routing process of the underlying network. Consequently, a non-participating switch in the underlying network may establish a path to a respective participating switch in association with the virtual address. Because the participating switches can be equidistant in the routing process, the paths to the participating switch from a non-participating switch can establish equal-cost multipath (ECMP) to the VGS.

To forward traffic toward the VGS in the fabric, a non-participating switch can operate as a tunnel endpoint while the VGS can be the other tunnel endpoint. The non-participating switch can perform a load balancing operation (e.g., based on hashing on a respective packet) among the equal-cost paths to the VGS and select one of the participating switches as the destination in the underlying network, thereby selecting the corresponding path from the ECMP. The non-participating switch can then forward the packet via a tunnel between the tunnel endpoints. Even though one of the paths to the VGS is selected in the underlying network, the destination of the tunnel header corresponds to the virtual address associated with the VGS.

If an event adversely affects a participating switch's capability of processing traffic destined to the VGS, a respective non-participating switch may need to divert traffic to other participating switches of the VGS. Hence, the non-participating switch may need to avoid selecting the path to the affected participating switch in the underlying network. Accordingly, the routing process (e.g., an exterior gateway protocol, such as exterior Border Gateway Protocol (eBGP)) of the underlying network should not select the path as one of the ECMP to the VGS for the duration of the event. To do so, the routing process of the underlying network may advertise a higher path cost than the cost of the other paths to the VGS. The paths to the VGS, hence, may not be considered as ECMP.

Since the events in a network can be dynamic, the initiation and termination of the path avoidance should also be dynamic. In particular, when the event is completed, the path avoidance should no longer be in effect, and the cost of the path should be reset to the cost of the other paths. When the path cost is reset, all paths to the VGS may have an equal cost in the routing process. However, with existing technologies, such event-driven dynamic adjustment of a path cost for the routing process of the underlying network of a fabric is not supported. Manually configuring the path cost for the routing process can be error-prone and may not be feasible.

To solve this problem, a respective participating switch may dynamically determine an event that may require non-participating switches of the fabric to avoid forwarding traffic to that participating switch. The participating switch can maintain a routing process instance, such as an eBGP instance, for the underlying network. Upon determining the event, the routing process instance may advertise a distinguishable cost (e.g., a high cost) for the links coupling the participating switch while publishing the virtual address of the VGS to the underlying network. The distinguishable cost can be based on Autonomous System (AS) "path-prepend" or Multi Exit Discriminator (MED). As a result, the routing process instances of a respective non-participating switch can determine that the device associated with the virtual address (i.e., the VGS) is reachable via a path with a distinguishable cost and a set of paths with an equal cost. Here, the distinguishable-cost path can be the path to the participating switch affected by the event.

It should be noted that a non-participating switch can use a path selection process for selecting a path in the underlying network for a tunnel from the non-participating switch to the VGS. In other words, since there are multiple switches in the VGS, for a tunnel to the same virtual address of the VGS, there can be multiple paths. The non-participating switch may use different paths leading to different participating switches for forwarding packets of the same flow. However, the non-participating switch may not include the distinguishable-cost path in the path selection process in the underlying network for the subsequent packets to the VGS.

For example, if the non-participating switch typically uses a hash function to select a path from the ECMP to the VGS in the underlying network, the distinguishable-cost path can be excluded from the hashing process since that path is no longer a part of the ECMP to the VGS. Accordingly, for subsequent packets, the non-participating switch can avoid sending packets to the participating switch affected by the event. In this way, a non-participating switch may forward traffic only to the participating switches that are not affected by the event. As a result, the traffic to the VGS in the fabric can be redirected to the other participating switches of the VGS.

Subsequently, the participating switch may determine that the event is complete. The routing process instance of the participating switch can then advertise a reset cost for the links coupling the participating switch while publishing the virtual address of the VGS to the underlying network. The reset cost can be the cost of the links prior to the event. The value of the reset cost may ensure the inclusion of the path to the participating switch in the ECMP to the VGS. As a result, the routing process instances of the non-participating switch can determine that the device associated with the virtual address (i.e., the VGS) is reachable via a set of paths with an equal cost. Hence, the non-participating switch may start including the path to the participating switch affected by the event in the path selection process for the subsequent packets to the VGS.

In this way, a respective participating switch can redirect the flow of traffic to the VGS in the fabric by advertising the distinguishable cost and the reset cost at the detection and completion of the event, respectively. This allows the VGS to redirect traffic using the routing process of the underlying network without impacting the tunneling protocol of the overlay network. Even when the virtual address of the VGS remains associated with the affected participating switch, the cost adjustment can be performed in the routing process of the underlying network. Furthermore, the initiation and termination of the avoidance of the affected participating switch can be dynamically performed at the detection and completion of the event, respectively.

The process of dynamically redirecting the traffic to a subset of the participating switches can be performed by a centralized controller (e.g., a Software-Defined Networking (SDN) controller) or an application running on the participating switch. For example, the controller or the application can configure the distinguishable cost and the reset cost at the detection and completion of the event, respectively, in the local database of a participating switch. Based on the update, a routing daemon associated with the routing process of the underlying network can facilitate the advertisement of the distinguishable cost and the reset cost.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of traffic redirection for a VGS of a distributed tunnel fabric using the underlying physical network, in accordance with an aspect of the present application. A network 100 can include a number of switches and devices. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via switch 106.

In FIG. 1, a respective link denoted with a dotted line in fabric 110 can be a tunnel. Switches of fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A respective link denoted with a dotted line in fabric 110 can be a link in an underlying network (or an underlay network) 150 of fabric 110. Underlying network 150 can be a physical network and a respective link of underlying network 150 can be a physical link. A VPN 130, such as an EVPN, can be deployed over fabric 110. Fabric 110 can include a VGS 106 that can couple fabric 110 to an external network 120. An external switch 107 can be coupled to VGS 106, thereby coupling external network 120 to fabric 110.

Here, switches 101 and 102 can operate as a single switch in conjunction with each other to facilitate VGS 106. VGS 106 can be associated with one or more virtual addresses (e.g., a virtual IP address and/or a virtual MAC address). A respective tunnel formed at VGS 106 can use the virtual address to form the tunnel endpoint. To efficiently manage data forwarding, switches 101 and 102 can maintain an inter-switch link (ISL) 140 between them for sharing control and/or data packets. ISL 140 can be a layer-2 or layer-3 connection that allows data forwarding between switches 101 and 102. ISL 140 can also be based on a tunnel between switches 101 and 102 (e.g., a VXLAN tunnel).

Because of the virtual address of VGS 106 is associated with both switches 101 and 102, other tunnel endpoints, such as switches 103, 104, and 105, of fabric 110 can consider VGS 106 as the other tunnel endpoint for a tunnel instead of switches 101 and 102. To forward traffic toward VGS 106 in fabric 110, a non-participating switch, such as switch 103, can operate as a tunnel endpoint while VGS 106 can be the other tunnel endpoint. From each of non-participating switches 103, 104, and 105, there can be a set of ECMP to VGS 106. A respective path in the ECMP can lead to one of the participating switches of VGS 106. In the example in FIG. 1, the number of paths in the ECMP can be two leading to switches 101 and 102, respectively.

During operation, switch 103 can receive a packet received from device 112 via an edge port (e.g., an Ethernet port). If the packet is destined to device 114, switch 103 can encapsulate the packet in a tunnel header and forward the encapsulated packet via a tunnel 132 to VGS 106. The encapsulated packet can then be carried by the links of underlying network 150 to one of switches 101 and 102. Switch 103 can perform a load balancing operation among the equal-cost paths in underlying network 150 that tunnel 132 can span over. For example, switch 103 can apply a hash function on the packet and select one of switches 101 and 102 as the destination in underlying network 150, thereby selecting the corresponding path from the ECMP. Switch 103 can then forward the packet via tunnel 132 over the selected path. Even though one of the paths to VGS 106 is selected in underlying network 150, the destination of the tunnel header can correspond to the virtual address associated with VGS 106.

If an event 160 adversely affects participating switch 101's capability of processing traffic destined to VGS 106, switches 103, 104, and 105 may need to divert traffic to the other participating switch 102 of VGS 106. Under such circumstances, a non-participating switch, such as switch 103, may need to avoid selecting path 134 to switch 101 in underlying network 150. Accordingly, a routing process instance (RPI) 174 (e.g., an eBGP instance) on switch 103 for underlying network 150 should not select path 134 as one of the ECMP to VGS 106 for the duration of event 160. To do so, RPI 172 on switch 101 for underlying network 150 may advertise a higher path cost for path 134 than the cost of the other path, which is the path to switch 102, to VGS 106. Hence, the paths to switches 101 and 102 may not be considered as ECMP.

Since event 160 can be dynamic, the initiation and termination of the avoidance for path 134 should also be dynamic. In particular, when event 160 is completed, the avoidance for path 134 should no longer be in effect, and the cost of path 134 should be reset to the cost of path 136. When the cost of path 134 is reset, paths 134 and 136 to VGS 106 may have an equal cost from switch 103 (e.g., from RPI 174). However, with existing technologies, such event-driven dynamic adjustment of the cost of path 134 for RPIs 172 and 174 of underlying network 150 is not supported. Manually configuring the cost of path 134 for RPIs 172 and 174 can be error-prone and may not be feasible.

To solve this problem, switches 101 and 102 may dynamically determine the occurrence of event 160 that may require non-participating switches 103, 104, and 105 to avoid forwarding traffic to switch 160. When switch 101 determines event 160, RPI 172 may advertise a distinguishable cost (e.g., a high cost) for the links coupling switch 101 while publishing the virtual address of VGS 106 to underlying network 150. The distinguishable cost can be based on AS "path-prepend" or MED. For example, switch 101 can send respective link-state advertisements (LSAs) 152, 154, and 156 via the links leading to the non-participating switches 103, 104, and 105, respectively. A respective LSA can include a route update indicating the distinguishable cost. Upon receiving LSA 152, RPI 174 of switch 103 can update the routing information base (RIB) and the corresponding forwarding information base (FIB) at switch 103 accordingly. RPI 174 can then determine that the device associated with the virtual address (i.e., VGS 106) is reachable via path 134 with a distinguishable cost and path 136 with the default cost associated with the ECMP to VGS 106.

Typically, switch 103 can use a path selection process for selecting one or paths 134 and 136 in underlying network 150 for tunnel 132 from switch 103 to VGS 106. In other words, since there are two switches 101 and 102 in VGS 106, for tunnel 132 to the same virtual address of VGS 106, there can be two paths. Switch 103 may use different paths leading to switches 101 and 102 for forwarding packets of the same flow. However, switch 103 may not include path 134 in the path selection process in underlying network 150 for the subsequent packets to VGS 106. For example, if switch 103 typically uses a hash function to select a path from equal-cost paths 134 and 136, path 134 can be excluded from the hashing process since path 134 is no longer a part of the ECMP to VGS 106. Accordingly, for subsequent packets, switch 103 can avoid sending packets to switch 101 and may forward traffic only to switch 102. As a result, the traffic to VGS 106 in fabric 110 can be redirected to switch 102 of VGS 106.

Subsequently, switch 101 may determine that event 160 is complete. RPI 172 of switch 101 can then advertise a reset cost for the links coupling switch 101 while publishing the virtual address of VGS 106 to underlying network 150. The reset cost can be the cost of the links prior to event 160. The value of the reset cost may ensure the inclusion of path 134 in the ECMP to VGS 106. Switch 101 can then send respective LSAs with the reset cost via the links leading to the non-participating switches 103, 104, and 105. As a result, RPI 174 of switch 103 can then determine that the device associated with the virtual address (i.e., VGS 106) is reachable via paths 134 and 136 with an equal cost. Hence, switch 103 may start including path 134 to switch 101 affected by event 160 in the path selection process for the subsequent packets to VGS 106.

In this way, switch 101 can redirect the flow of traffic to VGS 106 from switches 103, 104, and 105 in fabric 110 by advertising the distinguishable cost and the reset cost at the detection and completion of event 160, respectively. This allows VGS 106 to redirect traffic using the routing process of underlying network 150 without impacting the tunneling protocol of the overlay network in fabric 110. Even when the virtual address of VGS 106 remains associated with affected switch 101, RPI 172 can perform the cost adjustment in the routing process of underlying network 150. Furthermore, the initiation and termination of the avoidance of path 134 and corresponding switch 101 can be dynamically performed at the detection and completion of event 160, respectively.

The process of dynamically redirecting the traffic to switch 102 can be performed by a centralized controller (e.g., an SDN controller) or an application running on switch 101. The controller or the application can configure the distinguishable cost and the reset cost at the detection and completion of event 160, respectively, in the local database of switch 101. The local database can be a link-cost table for RPI 172 at switch 101. The link-cost table of switch 101 can be in the local database. Based on the update, a routing daemon associated with RPI 172 can facilitate the advertisement of the distinguishable cost and the reset cost.

Figure 2A:
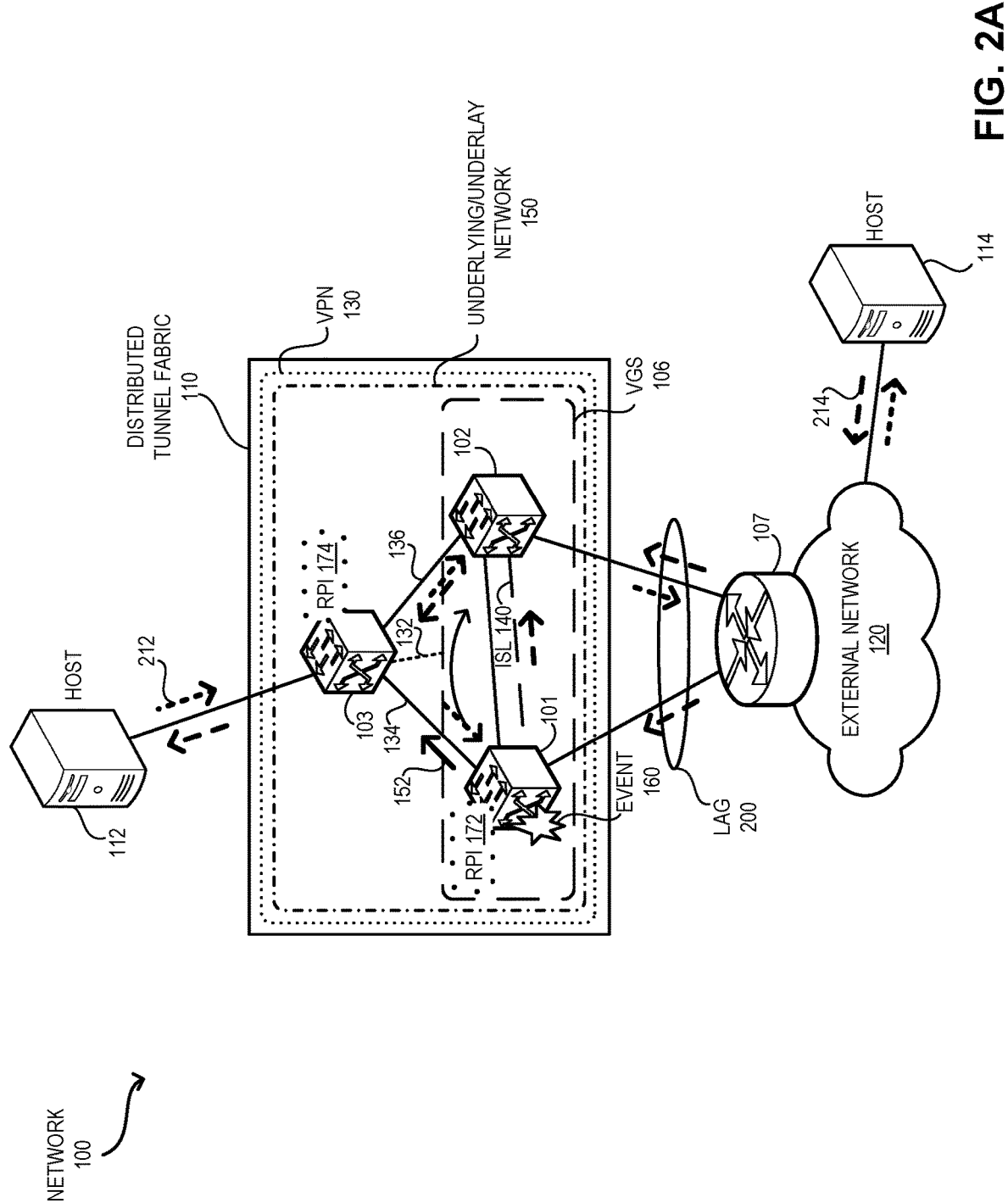
FIG. 2A illustrates an example of event-driven traffic redirection for a VGS of a distributed tunnel fabric, in accordance with an aspect of the present application.

FIG. 2A illustrates an example of event-driven traffic redirection for a VGS of a distributed tunnel fabric, in accordance with an aspect of the present application. In this example, devices 112 and 114 can be in communication with each other via fabric 110. Device 114 can be coupled to switch 107, which can be coupled to fabric 110 via a link aggregation group (LAG) 200. Consequently, switch 107 can be coupled to switches 101 and 102, and the coupling links can be aggregated based on a link aggregation protocol, such as the Link Aggregation Control Protocol (LACP). Device 112 can send a data flow 212 to device 114. Data flow 212 can include a sequence of packets. Switch 103 can receive packets of data flow 212 and determine that the packets of data flow 212 should be forwarded to VGS 106. Switch 103 can then encapsulate the packets with a tunnel header associated with tunnel 132. Based on the path selection process, distribute the encapsulated packets on paths 134 and 136.

However, due to event 160, switch 101, while being associated with the virtual address of VGS 106, may not process packets efficiently. In other words, even if switch 101 is operational (i.e., not powered off or unavailable), switch 101 may not be able to process packets efficiently due to event 160. Examples of event 160 can include, but are not limited to, inconsistent operational state for tunnel 132 at switches 101 and 102, overutilization of ISL 140, connection to device 214 non-operational, the arrival of traffic before detection of device 214, reloading or rebooting of switch 101, migration of connection from switch 101 to switch 102, and a timer-based trigger (e.g., a user-defined event). For instance, if tunnel 132 becomes operational and packets of data flow 212 arrive at switch 101 before determining the presence of device 214, switch 101 may not process the packets correctly.

Switch 101 can maintain a set of trigger conditions for corresponding events. If a trigger condition is satisfied, switch 101 can determine that a corresponding event has occurred. Upon determining the satisfaction of the trigger condition of event 160, switch 101 can determine the initiation (or triggering) of event 160. RPI 172 can then send LSA 152 with a distinguishable cost to switch 103 in underlying network 150. Upon receiving LSA 152, RPI 174 of switch 103 can update the local routing information. RPI 174 can then determine that packets of data flow 212 should be redirected from path 134 to path 136. Switch 103 can then forward the subsequent encapsulated packets of data flow 212 via path 136, thereby dynamically redirecting the encapsulated packets of data flow 212 to VGS 106 in fabric 110.

Switch 101 can also maintain a set of reset conditions for corresponding events. If a reset condition is satisfied, switch 101 can determine that the corresponding event has been completed. Upon determining the satisfaction of the reset condition of event 160, switch 101 can determine the termination (or completion) of event 160. RPI 172 can then send an LSA with a reset cost to switch 103 in underlying network 150. Upon receiving the LSA, RPI 174 of switch 103 can update the local routing information. RPI 174 can then determine that packets of data flow 212 now can be forwarded via paths 134 and 136. Switch 103 can then forward the subsequent encapsulated packets of data flow 212 via both paths 134 and 136, thereby dynamically readjusting the encapsulated packets of data flow 212 to VGS 106 in fabric 110.

Similarly, device 114 can send a data flow 214 to device 112. Switch 107 can receive the packets of data flow 214 and determine that the packets should be forwarded to fabric 110. Since switch 107 is coupled to fabric 110 via LAG 200, switch 107 can select one of the links of LAG 200 and forward a respective packet of data flow 214 via the selected link. For the same data flow 214, switch 107 can select different links of LAG 200 for different packets. As a result, both switches 101 and 102 can receive packets of data flow 212. However, due to event 160, switch 101 may not be able to forward traffic via fabric 110. Hence, switch 101 may forward packets of data flow 212 to switch 102 via ISL 140. In this way, even if switch 101 is operational, any inefficiency or disruption in traffic forwarding at switch 101 can be avoided Switch 101 can maintain a set of events that can lead to traffic redirection. FIG. 2B illustrates a non-exhaustive set of events causing traffic redirection for a VGS of a distributed tunnel fabric, in accordance with an aspect of the present application. Set of events 250 at switch 101 can include an event 254, a trigger condition 256, and a reset condition 258. Switch 101 can determine the occurrence of event 254 if trigger condition 256 is satisfied. Furthermore, switch 101 can determine the completion of event 254 if reset condition 256 is satisfied. A respective event can be associated with an event identifier 252, which may be included in an LSA to notify other switches of fabric 110 regarding the event. Switch 101 can store set of events 250 in a data structure, such as an event table. The event table can be a database table.

Event identifier 262 can correspond to an event with inconsistent tunnel states. The trigger condition can indicate that the local tunnel state is down and the peer tunnel state is up for a particular tunnel. For example, the state can be "up" for tunnel 132 at switch 101 and "down" at switch 102. The reset condition can indicate that all tunnel states are up (i.e., both at switches 101 and 102). Another event identifier 264 can correspond to an event where an ISL (e.g., ISL 140) is overutilized with redirection traffic. The trigger condition can indicate that the volume of traffic over the ISL is greater than a threshold. Similarly, the reset condition can indicate that the volume of traffic over the ISL is below a threshold for a period, which can prevent a ping-pong effect.

Furthermore, event identifier 266 can correspond to an event where the client-facing connections (e.g., switch virtual interfaces (SVIs) or switch ports for the client) are non-operational. The trigger condition can indicate that all edge connections are non-operational at the local switch. For example, the configuration associated with the client devices may not be in an "up" state at switch 101. The corresponding reset condition can indicate that at least a subset of the edge connections is operational (e.g., the connections facing a subset of client devices can be operational). Moreover, event identifier 268 can correspond to an event that indicates the arrival of traffic via the fabric prior to detecting a host (e.g., a client end device) from edge ports. The trigger condition can then indicate that the tunnels at the switch are operational (e.g., tunnel 132 at switch 101) prior to detecting a local host, such as an end device. The reset condition can include learning host information from edge port(s).

In addition, event identifier 270 can correspond to an event indicating the reload/reboot of the local switch. The trigger condition can indicate that the local switch is initialized and the VPN is operational at the peer switch. For example, switch 101 can be initialized after a power cycle, and the VPN can be operational on switch 102. Due to the reboot of switch 101, the local tunnels at switch 101, such as tunnel 132, may not be operational for a short period. However, switch 103 may learn the presence of switch 101 in underlying network 150 and start selecting the path to switch 101. However, since the tunnels are not operational yet, forwarding via tunnel 132 in fabric 110 may not be available, thereby causing a conflict. The reset condition can then indicate that all tunnel states are up (i.e., both at switches 101 and 102).

Moreover, event identifier 272 can correspond to an event indicating a single-point client connection. For example, due to client migration, all devices of a client can be coupled only to switch 102 and not to switch 101. The trigger condition can indicate that the routing adjacencies to the client devices are unavailable. The reset condition can then indicate that the routing adjacencies to the client devices are re-established and the corresponding routers are re-learned. Set of events 250 can also include a user-defined event, such as a timer-based event associated with event identifier 274. A user, such as an administrator, can define a timer to indicate the duration for which traffic should be redirected. Accordingly, the trigger condition can be the initiation of the timer, and the reset condition can be the completion of the timer.

Figure 3:
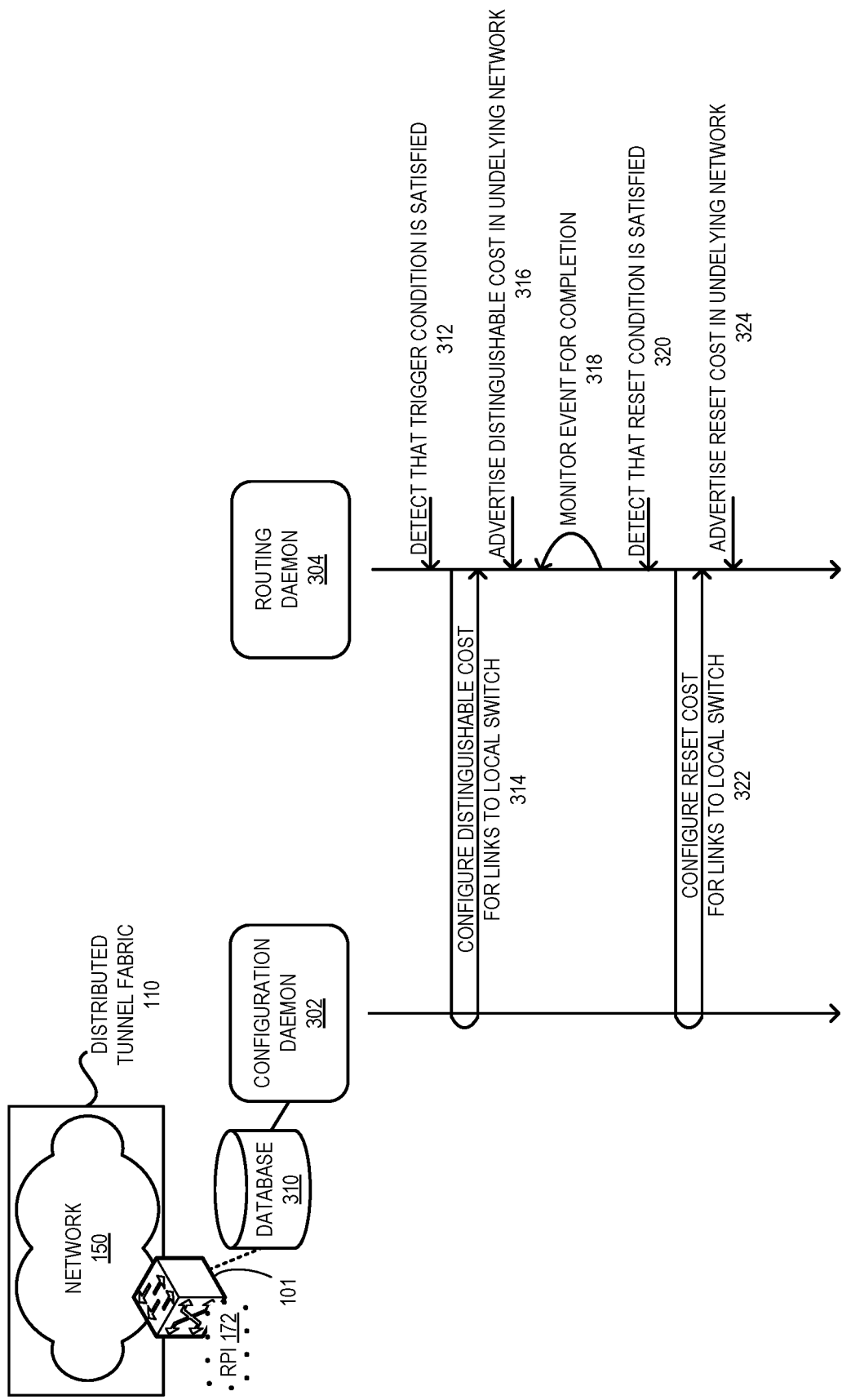
FIG. 3 illustrates an example of internal operations in a participating switch of a VGS of a distributed tunnel fabric facilitating traffic redirection, in accordance with an aspect of the present application.

FIG. 3 illustrates an example of internal operations in a participating switch of a VGS of a distributed tunnel fabric facilitating traffic redirection, in accordance with an aspect of the present application. Switch 101 can maintain a database 310 (e.g., based on Open vSwitch Database (OVSDB)) for storing configuration information associated with switch 101. For example, the list cost of a respective adjacent link can be maintained in a table of database 310. A configuration daemon 302 of switch 101 can update the configuration information in database 310. RPI 172 can be facilitated by a routing daemon 304 (e.g., a BGP daemon). Based on the routing updates from routing daemon 304, configuration daemon 302 may update database 310 to facilitate traffic redirection from switch 101.

During operation, routing daemon 304 can detect that a trigger condition associated with an event is satisfied (i.e., the event is triggered or initiated) (operation 312). Based on the detection of the trigger condition, configuration daemon 302 can configure a distinguishable cost for the links to the local switch (operation 314). For example, configuration daemon 302 can configure the distinguishable cost for the links to switch 101 in database 310. The configuration of the distinguishable cost can cause routing daemon 304 to advertise the distinguishable cost in the underlying network (operation 316). Consequently, the respective routing daemons on other switches in the underlying network can determine that the links reaching switch 101 is associated with the distinguishable cost.

Routing daemon 304 can then monitor the event for completion (operation 318). Subsequently, routing daemon 304 can detect that the corresponding reset condition associated with the event is satisfied (i.e., the event is completed or terminated) (operation 320). Based on the detection of the reset condition, configuration daemon 302 can configure a reset cost for the links to the local switch (operation 322). The reset cost can correspond to the default cost indicated in the ECMP to the VGS. The configuration of the reset cost can cause routing daemon 304 to advertise the reset cost in the underlying network (operation 324). Consequently, the respective routing daemons on other switches in the underlying network can determine that the links reaching switch 101 is associated with the reset cost. Accordingly, the other switches can incorporate the path to switch 101 in the path selection process.

Figure 4:
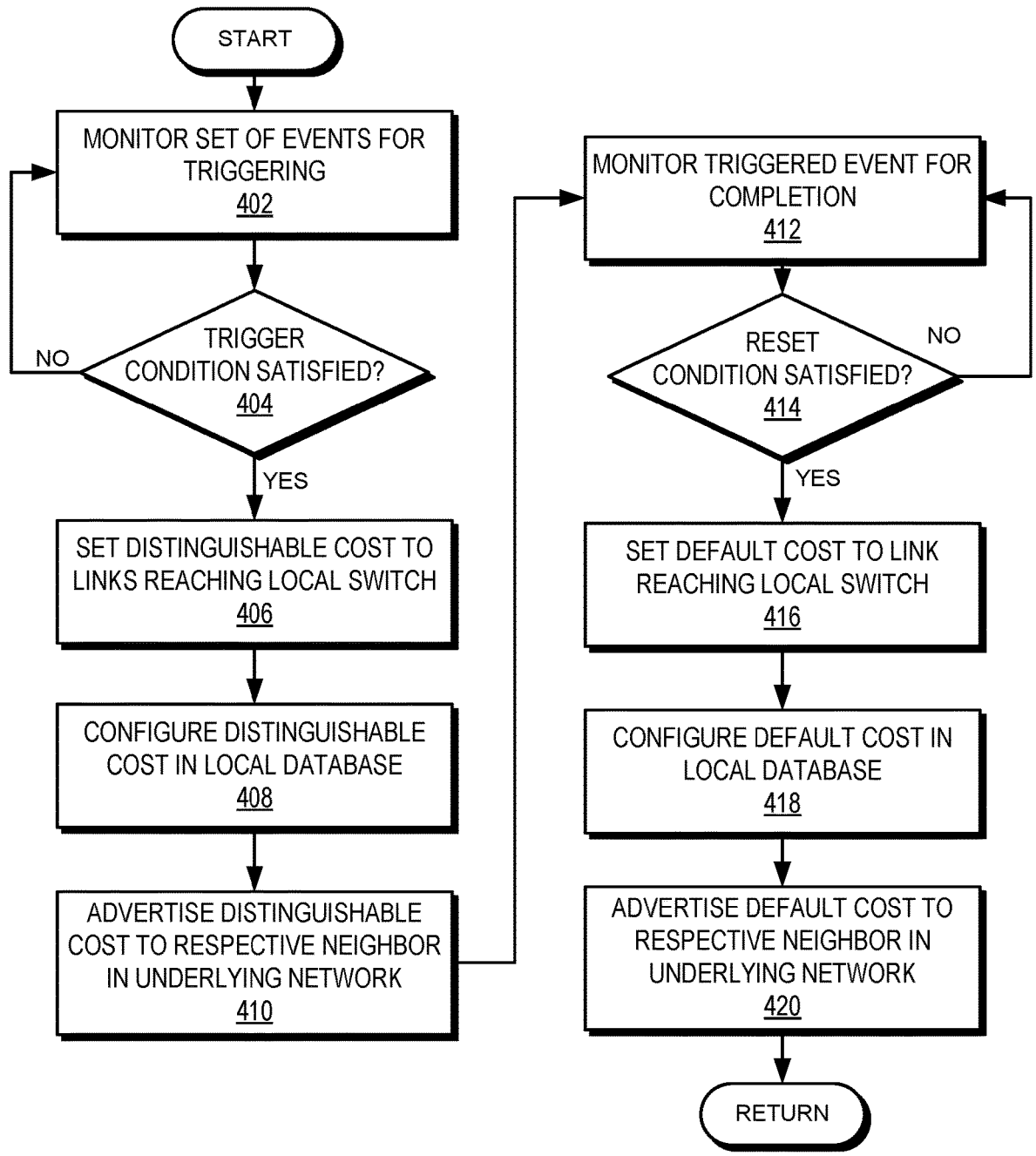
FIG. 4 presents a flowchart illustrating the process of a participating switch of a VGS facilitating event-driven traffic redirection, in accordance with an aspect of the present application.

FIG. 4 presents a flowchart illustrating the process of a participating switch of a VGS facilitating event-driven traffic redirection, in accordance with an aspect of the present application. During operation, the switch can monitor a set of events for triggering (operation 402) and determine whether a trigger condition for an event is satisfied (i.e., an event is triggered) (operation 404). Until the trigger condition for an event is satisfied, the switch can continue to monitor the set of events for triggering (operation 402). On the other hand, if the trigger condition for an event is satisfied, the switch can set a distinguishable cost to the links reaching the local switch (operation 406). Accordingly, the switch can configure the distinguishable cost in the local database (operation 408) and advertise the distinguishable cost to a respective neighbor in the underlying network (operation 410).

The switch can then monitor the triggered event for completion (operation 412) and determine whether a reset condition for the event is satisfied (i.e., the event is completed) (operation 414). Until the reset condition for the event is satisfied, the switch can continue to monitor the triggered event for completion (operation 412). On the other hand, if the reset condition for the event is satisfied, the switch can set a reset cost to the links reaching the local switch (operation 416). Accordingly, the switch can configure the reset cost in the local database (operation 418) and advertise the reset cost to a respective neighbor in the underlying network (operation 420).

Figure 5:
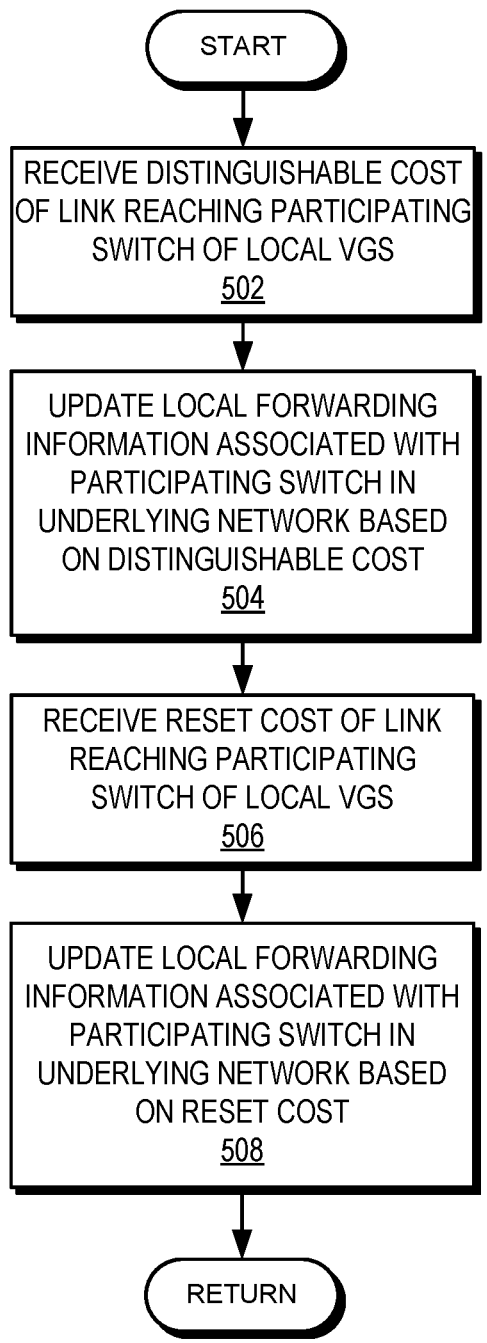
FIG. 5 presents a flowchart illustrating the process of a switch of a distributed tunnel fabric redirecting traffic to a participating switch of a VGS of the fabric, in accordance with an aspect of the present application.

FIG. 5 presents a flowchart illustrating the process of a switch of a distributed tunnel fabric redirecting traffic to a participating switch of a VGS of the fabric, in accordance with an aspect of the present application. During operation, the switch can receive a distinguishable cost of a link reaching a participating switch of the local VGS (operation 502). The switch can then update the local forwarding information associated with the participating switch in the underlying network based on the distinguishable cost (operation 504). This allows the switch to avoid the participating switch in the path selection process.

Subsequently, the switch can receive a reset cost of the link reaching the participating switch of the local VGS (operation 506). The switch can then update the local forwarding information associated with the participating switch in the underlying network based on the reset cost (operation 508). This allows the switch to incorporate the path to the participating switch in the path selection process. The forwarding information can be stored in one or more tables, such as an FIB and an RIB. The tables can be stored in a database of the switch.

Figure 6:
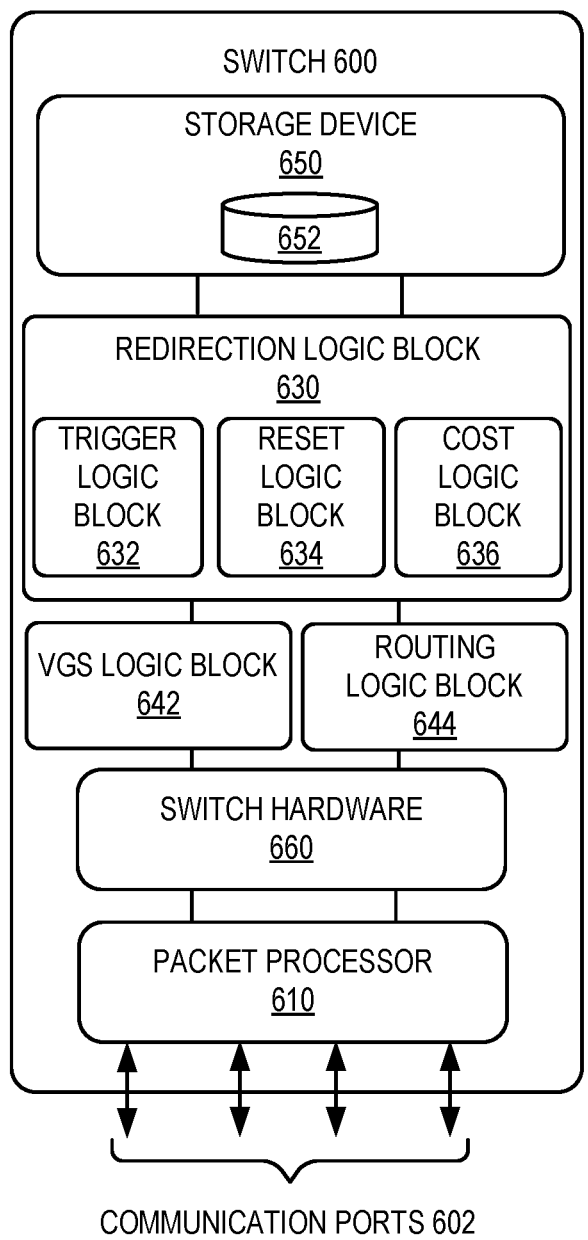
FIG. 6 illustrates an exemplary switch facilitating a VGS supporting efficient traffic direction, in accordance with an aspect of the present application.

FIG. 6 illustrates an exemplary switch facilitating a VGS supporting efficient traffic direction, in accordance with an aspect of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with routing, configuration, and interface of switch 600. Switch 600 can include a VGS logic block 642 and a routing logic block 644. VGS logic block 642 can allows switch 600 to operate as a VGS, such as VGS 106, in a distributed tunnel fabric. To do so, VGS logic block 642 may operate in conjunction with another switch. Routing logic block 644 can facilitate the operations of an RPI for switch 600 and determine paths in the underlying network.

Switch 600 can include a redirection logic block 630, which can include a trigger logic block 632, a reset logic block 634, and a cost logic block 636. Redirection logic block 630 can operate in conjunction with routing logic block 644. Trigger logic block 632 can monitor a set of events and determine whether the trigger condition for an event is satisfied. Reset logic block 634 can monitor the progress of the triggered event and determine whether the reset condition for the event is satisfied.

If an event is triggered, cost logic block 636 can configure a distinguishable cost for the local routing information (e.g., in database 652) and advertise the distinguishable cost via a respective link coupling switch 600. On the other hand, when a triggered event is complete, cost logic block 636 can configure a reset cost for the local routing information (e.g., in database 652) and advertise the reset cost via a respective link coupling switch 600. Switch 600 may use an LSA comprising a route update with the distinguishable or reset cost for the advertisement.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   participating, by a first switch, in a virtual switch in conjunction with a second switch, wherein the virtual switch is to operate as a gateway for an overlay tunnel fabric that includes the first and second switches, wherein a path between a respective switch pair of an underlying network of the overlay tunnel fabric is determined based on a routing process, wherein the first and second switches individually participate in the routing process, and wherein packets to a tunnel to the virtual switch are distributed among paths to the first and second switches in the underlying network;
   determining, by the first switch, a trigger condition for an event indicating that packets subsequently received via the tunnel to the virtual switch is to be directed to a path to the second switch, wherein the first and second switches remain in an operational state; and
   in response to determining the trigger condition, advertising a high cost for a link to the first switch for the routing process in the underlying network, thereby bypassing the distribution of packets to the virtual switch among the paths to the first and second switches.

2. The method of claim 1, further comprising, in response to determining that the event is complete, advertising a default cost for the link to the first switch for the routing process in the underlying network, thereby resetting the distribution of packets to the virtual switch among the paths to the first and second switches.

3. The method of claim 1, wherein the trigger condition indicates that a tunnel state is inconsistent between the switch and the second switch.

4. The method of claim 1, wherein the trigger condition indicates that a volume of traffic on an inter-switch link between the first and second switches is above a threshold.

5. The method of claim 1, wherein the trigger condition indicates that a tunnel to the virtual switch is operational at the first switch prior to detecting a host via an edge port.

6. The method of claim 1, wherein the trigger condition indicates that:
   the first switch has rebooted; and
   packet processing for the overlay tunnel fabric is operational in the second switch.

7. The method of claim 1, wherein the trigger condition indicates one or more of:
   non-operational edge connections at the first switch; and
   unavailable routing adjacencies to devices of a client, thereby indicating migration of the client.

8. The method of claim 1, wherein the trigger condition indicates initiation of a timer indicating the duration of the event.

9. The method of claim 1, further comprising configuring the high cost in routing information associated with the underlying network;
   wherein advertising the high cost comprising sending a link-state advertisement using a local instance of the routing process.

10. A non-transitory computer-readable storage medium storing instructions that when executed by a computer cause the computer to perform a method, the method comprising:
    participating, by a first switch, in a virtual switch in conjunction with a second switch, wherein the virtual switch is to operate as a gateway for an overlay tunnel fabric that includes the first and second switches, wherein a path between a respective switch pair of an underlying network of the overlay tunnel fabric is determined based on a routing process, wherein the first and second switches individually participate in the routing process, and wherein packets to a tunnel to the virtual switch are distributed among paths to the first and second switches in the underlying network;
    determining, by the first switch, a trigger condition for an event indicating that packets subsequently received via the tunnel to the virtual switch is to be directed to a path to the second switch, wherein the first and second switches remain in an operational state; and
    in response to determining the trigger condition, advertising a high cost for a link to the first switch for the routing process in the underlying network, thereby bypassing the distribution of packets to the virtual switch among the paths to the first and second switches.

11. The non-transitory computer-readable storage medium of claim 10, wherein the method further comprises, in response to determining that the event is complete, advertising a default cost for the link to the first switch for the routing process in the underlying network, thereby resetting the distribution of packets to the virtual switch among the paths to the first and second switches.

12. The non-transitory computer-readable storage medium of claim 10, wherein the trigger condition indicates that a tunnel state is inconsistent between the switch and the second switch.

13. The non-transitory computer-readable storage medium of claim 10, wherein the trigger condition indicates that a volume of traffic on an inter-switch link between the first and second switches is above a threshold.

14. The non-transitory computer-readable storage medium of claim 10, wherein the trigger condition indicates that a tunnel to the virtual switch is operational at the first switch prior to detecting a host via an edge port.

15. The non-transitory computer-readable storage medium of claim 10, wherein the trigger condition indicates that:
   the first switch has rebooted; and
   packet processing for the overlay tunnel fabric is operational in the second switch.

16. The non-transitory computer-readable storage medium of claim 10, wherein the trigger condition indicates one or more of:
   non-operational edge connections at the first switch; and
   unavailable routing adjacencies to devices of a client, thereby indicating migration of the client.

17. The non-transitory computer-readable storage medium of claim 10, wherein the trigger condition indicates initiation of a timer indicating the duration of the event.

18. The non-transitory computer-readable storage medium of claim 10, wherein the method further comprises configuring the high cost in routing information associated with the underlying network;
   wherein advertising the high cost comprising sending a link-state advertisement using a local instance of the routing process.

19. A computer system, comprising:
   a processor;
   a memory device;
   a gateway logic block to participate, in a virtual computer system in conjunction with a second computer system, wherein the virtual computer system is to operate as a gateway for an overlay tunnel fabric that includes the computer system and the second computer system, wherein a path between a respective computer system pair of an underlying network of the overlay tunnel fabric is determined based on a routing process, wherein the computer system and the second computer system individually participate in the routing process, and wherein packets to a tunnel to the virtual computer system are distributed among paths to the computer system and the second computer system in the underlying network;
   a trigger logic block to determine a trigger condition for an event indicating that packets subsequently received via the tunnel to the virtual computer system is to be directed to a path to the second computer system, wherein the computer system and the second computer system remain in an operational state; and
   a cost logic block to, in response to determining the trigger condition, advertise a high cost for a link to the computer system for the routing process in the underlying network, thereby bypassing the distribution of packets to the virtual computer system among the paths to the computer system and the second computer system.

20. The computer system of claim 19, further comprising a reset logic block to determine whether the event is complete; and
   wherein the cost logic block is further to advertise a default cost for the link to the computer system for the routing process in the underlying network, thereby resetting the distribution of packets to the virtual computer system among the paths to the computer system and the second computer system.

* * * * *